United States Patent Office 2,862,768
Patented Dec. 2, 1958

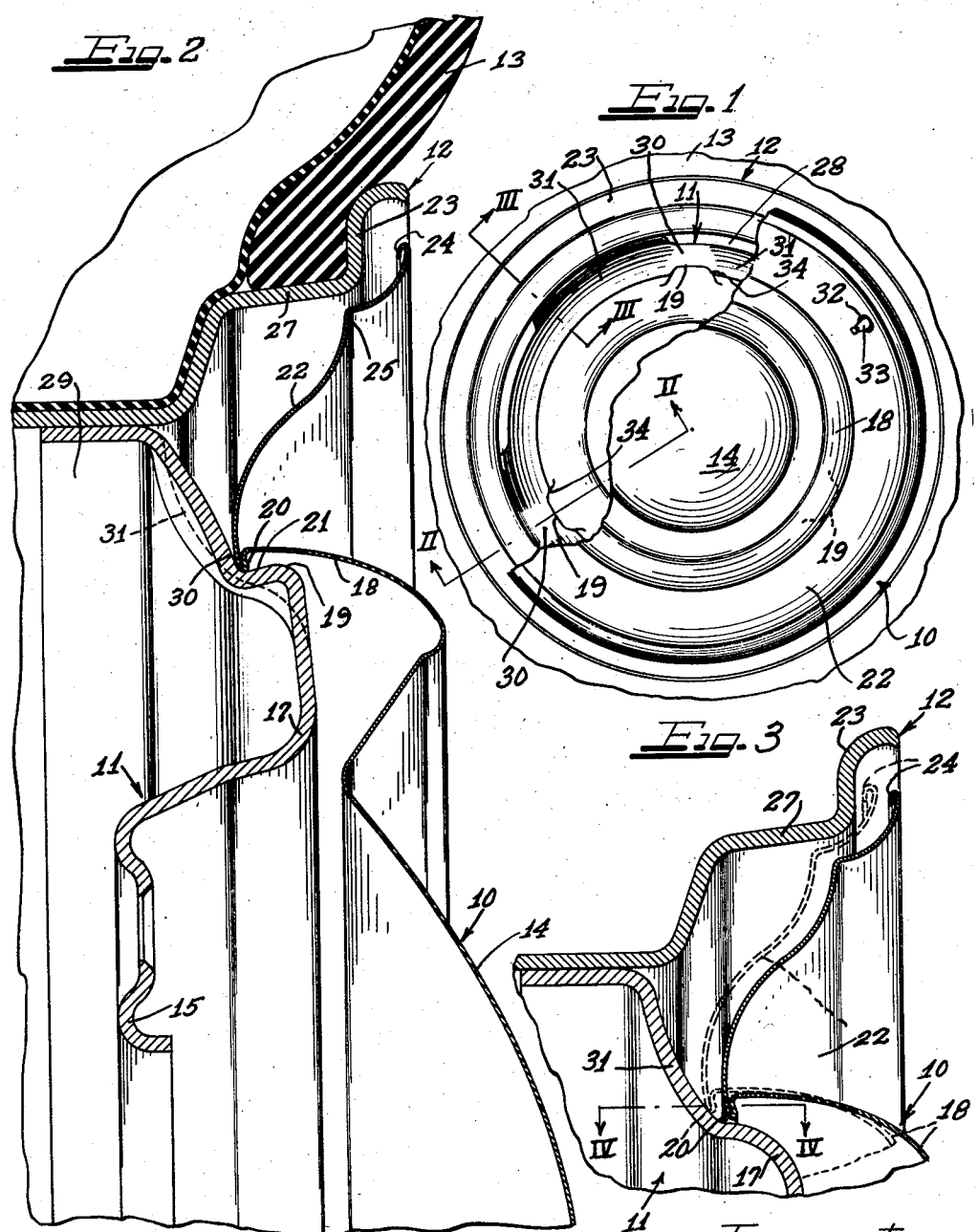

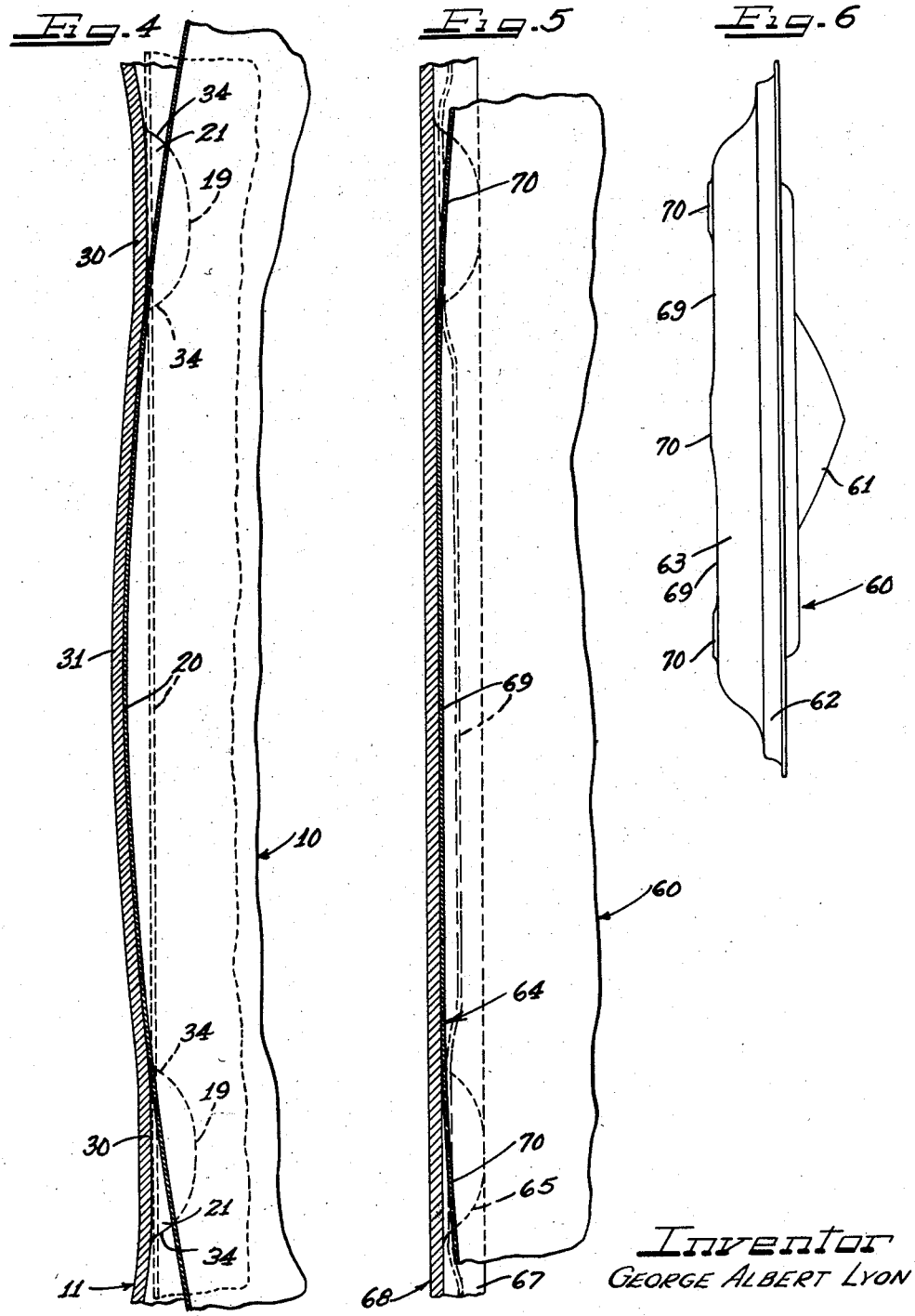

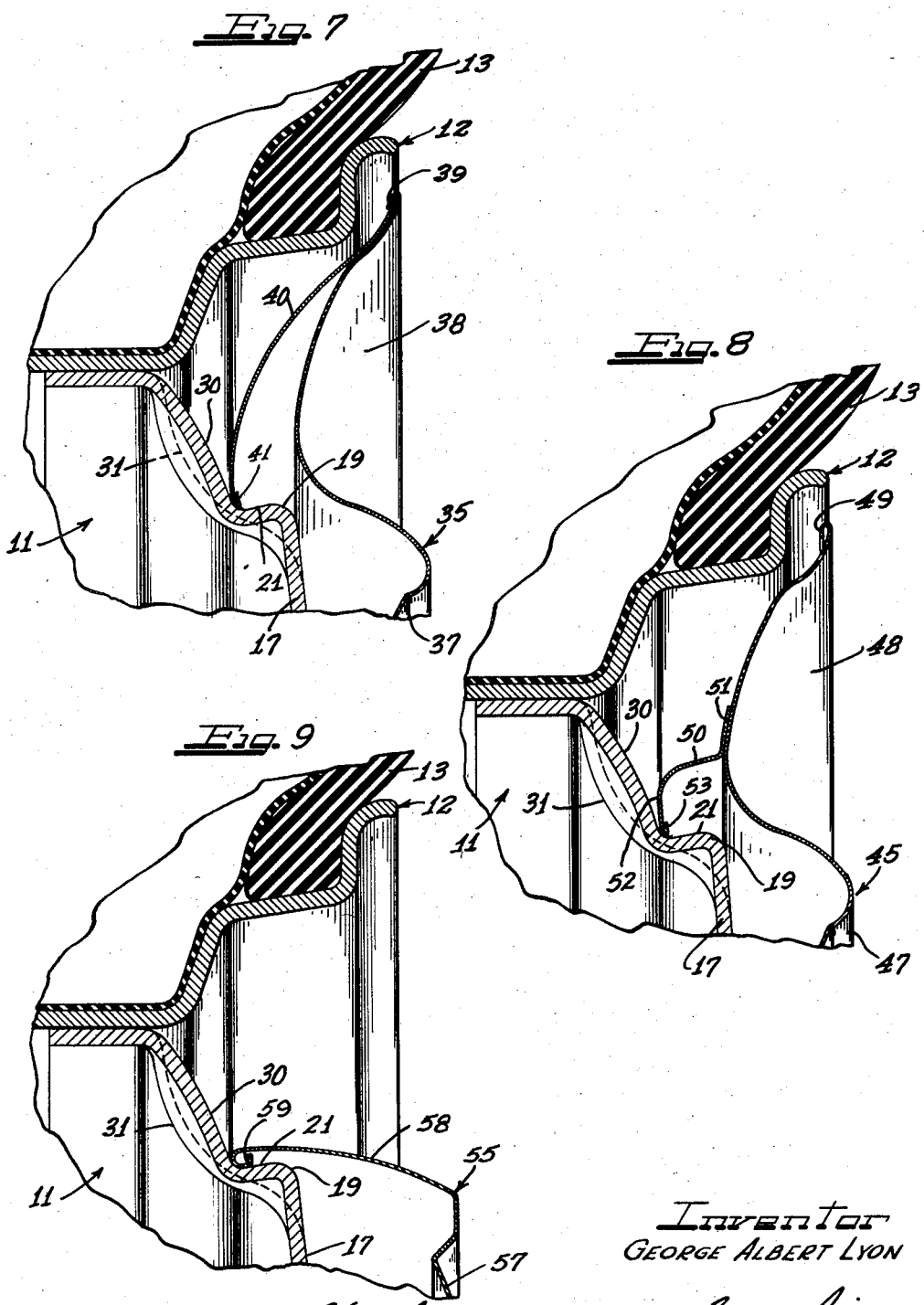

2,862,768

WHEEL COVER

George Albert Lyon, Detroit, Mich.

Application June 10, 1954, Serial No. 435,724

11 Claims. (Cl. 301—37)

The present invention relates to improvements in wheel structures and more particularly concerns the ornamental and protective covering of the outer sides of vehicle wheels such as automobile wheels.

An important object of the present invention is to provide an improved wheel structure wherein a cover is disposed at the outer side thereof and retained in position by engagement with bumps on the wheel body.

Another object of the invention is to provide an improved wheel structure wherein a cover is maintained on the outer side of the wheel in engagement with retaining bumps on the wheel body but under less stretching of the retaining portion of the cover, but nevertheless improved retention of the cover.

A further object of the invention is to provide an improved wheel structure provided with a novel structure on the wheel body enabling application of a cover to the wheel in association with retaining bumps on the wheel body with substantially less stretching of the bump-engaging portion of the cover in the application and removal of the cover than has been generally expedient in prior constructions.

Still another object of the invention is to enable the retaining portion of a wheel cover engageable with retaining bumps on a wheel body to be substantially stiffer and requiring less resilient deflectability than in prior structures.

Yet another object of the invention is to provide an improved expedient for applying and removing a wheel cover with respect to a wheel body having bumps thereon for retention of the cover.

A still further object of the invention is to provide an improved cover for disposition at the outer side of a vehicle wheel provided with retaining bumps by which the cover is adapted to be retained on the wheel.

Other objects, features and advantages of the present invention will be readily apparent from the following detailed description of certain preferred exemplary embodiments as shown on the accompanying drawings, in which:

Figure 1 is a side elevational view of a vehicle wheel embodying features of the invention and showing a wheel cover partially broken away for purpose of clarity;

Figure 2 is an enlarged fragmentary radial sectional view taken substantially on the line II—II of Figure 1;

Figure 3 is an enlarged fragmentary sectional detail view taken substantially on the line III—III of Figure 1;

Figure 4 is a more or less schematic, developed sectional elevational view taken substantially on the line IV—IV of Figure 3, and having regard to the dash outline position of the cover in Figure 3;

Figure 5 is a more or less schematic, developed sectional elevational view similar to Figure 4 but showing a modification;

Figure 6 is an edge elevational view of a cover showing the modification of Figure 5;

Figure 7 is a fragmentary radial sectional view through a wheel structure showing a further modification;

Figure 8 is a fragmentary radial sectional view through a wheel structure showing another modification; and Figure 9 is a fragmentary radial sectional view through a wheel structure showing still another modification.

According to the present invention a cover 10 is adapted to be applied to the outer side of a vehicle wheel comprising a disk spider body 11 supporting a multi-flange, drop-center tire rim 12 adapted to carry a pneumatic tire and tube assembly 13.

By preference, the cover 10 is made from sheet metal such as stainless steel or sheet brass, or the like, and in this instance is of the full disk type in which a single sheet metal plate is of a diameter to substantially cover not only the wheel body 11 but also the tire rim 12. To this end the cover 10 comprises a central crown portion 14 for substantially overlying a central bolt-on flange 15 of the wheel body and an intermediate annular axially outwardly directed reinforcing nose bulge 17 of the wheel body. At its radially outer side the crown portion 14 of the cover is provided with a generally axially inwardly directed annular flange wall portion 18 adapted in assembly with the wheel to lie in spaced relation at the radially outer side of the nose bulge 17 about a series of equally peripherally spaced generally radially outwardly projecting cover-retaining bumps 19 pressed from the material at the radially outer side of the nose bulge.

Cover retaining interengagement of the cover 10 with the retaining bumps 19 is effected by means of retaining ring structure, in this instance comprising an inturned annular intermediate cover-retaining fold flange 20 projecting generally radially inwardly and extending slightly obliquely axially outwardly at the axially inner terminus of the crown side wall flange 18 and engaging under resilient tension with generally undercut axially and radially inwardly sloping oblique retaining shoulders 21 on the bumps 19.

It will be observed that the retaining flange fold 20 comprises part of the juncture with the side of the crown of the cover of a radially outer annular integral portion 22 of the cover which extends in overlying relation to the juncture between the wheel body and the tire rim and substantially concealingly overlies the tire rim. To this end the cover portion 22 extends generally radially and axially obliquely outwardly and is of a diameter to overlie a terminal flange 23 of the tire rim, with the outer edge extremity of the cover provided with an underturned reinforcing and finishing bead-like flange 24. Intermediately the cover portion 22 is provided with an annular axially inwardly indented reinforcing rib 25 which in assembly with the wheel preferably lies opposite the juncture of the terminal flange 23 of the tire rim with an intermediate generally axially extending flange 27 of the tire rim. Thereby a reinforced pry-off shoulder is provided by the rib 25 spaced inwardly from the reinforcing edge bead 24. Moreover, by the spaced relation of the cover portion 22 relative to the tire rim 12, air circulation and dirt escape passage is provided cooperatively related to wheel openings 28 provided at appropriate intervals by insetting of an axially inwardly directed attachment flange 29 on the outer margin of the wheel body 11 which is secured in suitable manner to the base of the tire rim 12.

Novel means are provided to facilitate not only application of the cover 10 to the wheel, but also pry-off of the cover. Such means have been devised to enable application and removal of the cover with minimum radial stretching or resilient deflection of the retaining bead or fold flange 20, thus permitting closer tolerance and tighter grip of the retaining bead flange 20 with the retaining bumps 19. To this end, the retaining bumps 19 are preferably three in number spaced equidistantly apart and therefore affording substantial space therebetween exposing a substantial area radially outwardly from the reinforcing nose bulge 17 of the wheel body to the portions of the cover between the retaining bumps. Immediately radially outwardly adjacent to the inner ends of the bump shoulders 21, and in an annular generally axially outwardly facing area of the wheel body between the retaining bumps and the attachment flange 29, the wheel body is formed to provide a bottoming shoulder 30 against which the axially inner side of the retaining flange fold 20 of the cover is engageable to determine the axially inward disposition of the cover when fully applied to the wheel, for thereby maintaining the radially outer portion 22 of the cover in predetermined spaced relation to the tire rim. Then, in order to enable the retaining bead flange 20 to be tilted in toward substantially bottomed engaged relation with the bottoming shoulder 30 contiguous two adjacent ones of the retaining bumps 19 as an incident to application of the cover to the wheel, the portion of the wheel body intervening between at least two of the bottoming shoulders 30 is depressed or recessed axially inwardly as shown at 31 (Figs. 1 through 4) so that the arcuate portion of the retaining bead or flange 20 intermediate the retaining bumps will be accommodated or cleared. Since the retaining shoulder bead 20 of the cover now engages the two bumps at the axially inner sides of the respective shoulders 21 of the bumps and thus at the radially inward extremity or smallest diameter defined by the undercut retaining shoulders 21 of the bumps, radially outward resilient deflection of the retaining shoulder flange 20 will be required only at one point, namely at the remaining one of the bumps 19 to cam over the radially outwardly projecting nose of such bump to snap down into engagement with the undercut retaining shoulder 21 thereof.

In Figure 3 the cover is shown in dash outline in the initial tilted-in position as the first step in assembling the cover with the wheel. In the full line position of Figure 3, the cover is shown after the diametrically opposite side has been snapped over the remaining retaining bump so that the cover assumes a centered substantially level position relative to the wheel. Referring to Figure 4, the full line position of the cover, and more particularly the retaining flange 20 shows the same in the initial position incident to applying the cover to the wheel and shows how, in such position, the flange 20 engages substantially against the limit shoulder portions 30 of the wheel body and at the axially innermost extremity of the respective undercut retaining shoulders 21 of the retaining bumps. Then after the cover has been swung into the final position with the diametrically opposite side of the retaining bead flange 20 snapped behind the last or remaining one of the retaining bumps, the tilted-in portion of the cover moves out toward the dash line position of Figure 4 wherein the cover is centered and level with the wheel.

It will be appreciated, of course, that in prying the cover from the wheel, just the reverse action will take place. That is, as the cover is pried axially outwardly relative to one of the retaining bumps 19, that portion of the flange 20 will yield resiliently radially outwardly as it cams axially outwardly along the undercut retaining shoulder 21 of the retaining bump, and the diametrically opposite side of the cover will tilt axially inwardly into the adjacent depression or clearance recess 31 of the wheel body. Thus, the portions of the cover contiguous and in engagement with the remaining two retaining bumps is relieved from deflection as an incident of the pry-off. In the absence of the depression 31 to receive the tilted in portion of the cover, it will be clear that the portions of the retaining bead flange 20 engaging the retaining bumps at each opposite side of the tilted-in portion would be forced to climb or cam at least a substantial distance axially outwardly along the incline of the retaining shoulders 21 of the bumps and thus, at the same time as the stretching or deflection of the flange 20 adjacent the point of pry-off, would also necessarily have to stretch and deflect by virtue of the progressively increasing diameter defined by the retaining shoulders 21 axially outwardly.

In order to facilitate pry-off, the areas of the wheel body radially outwardly from the nose bulge 17 between all three of the limit shoulders 30 are provided with the cover-retaining clearance depressions 31. However, as a practical matter, in applying the cover to the wheel, that portion thereof having a valve stem aperture 32 will usually be canted toward the wheel first so as to center a valve stem 33 through the opening. Therefore, the valve stem 33 is preferably centered with respect to one of the depressed cover areas 31.

In order to clear the uptilted portions of the retaining flange bead 20 at the outer sides of the bumps 19 with respect to the hollowed out or depressed portion 31 into which the cover has been canted in applying or removing the same, the sides of the retaining bumps 19 are preferably chamfered or rounded off as shown at 34. The value of this expedient can be appreciated on referring to Figure 4 where it will be seen that the flange bead 20 arcs past and around the respective adjacent retaining bumps 19 as it is canted into the depression 31 and as it rocks out of the depression on the limit shoulders 30 into the final centered, squared up relation to the wheel in the final assembly.

In each of the modifications of Figures 7, 8 and 9 the wheel is substantially the same as the wheel shown in Figure 2, including the retaining bumps 19, the axial position-limiting shoulders 30 and the cover clearance depressions 31. Therefore identical reference numerals in each of Figures 7, 8 and 9 identify the same parts or features of the wheel.

In the modification of Figure 7, a wheel cover 35 is applied to the outer side of the wheel and comprises a cover plate having a central crown portion 37 for overlying the wheel body and an outer annular marginal portion 38 for overlying the tire rim. At its outer extremity the cover plate is provided with an underturned reinforcing and finishing flange 39 which is utilized to secure in place behind the cover a retaining ring 40. Herein the retaining ring 40 comprises a sheet metal member having its radially outer margin clamped in place at the back of the cover portion 38 by the underturned flange 39, and extending generally radially and axially inwardly in diverging relation to the cover portion 38 to a turned back annular reinforcing and retaining bead 41 of a diameter slightly less than the minimum diameter described about the axially inner end portions of the cover retaining bump oblique shoulders 21. The retaining bead flange structure 41 is fairly stiff but is sufficiently resilient so that the cover can be applied to the wheel in substantially the same manner as the cover 10 is applied to the wheel as described hereinabove. That is, the retaining bead porton 41 is canted into one of the depressed portions 31 of the cover body so that the bead engages at the inner ends of the remaining shoulders 21 of the two adjacent retaining bumps 19 and then the cover is pushed axially inwardly at the opposite side so that at the opposite side the retaining bead 21 will stretch over and snap behind the remaining one of the retaining bumps 19.

In the modification of Figure 8 a cover 45 is applied to the outer side of the wheel and comprises a cover plate having a central crown portion 47 for overlying the wheel body and a radially outer annular marginal portion 48 for overlying the tire rim, with an underturned outer edge reinforcing and finishing bead 49. For retaining the cover 45 on the wheel, the cover is provided with an annular retaining ring 50 having a generally radially outwardly extending flange 51 which is secured to the back of the cover as by welding or the like. At its axially inner portion the ring 50 is provided with a generally radially inwardly directed flange 52 having an outwardly and reversely turned reinforcing and retaining bead flange structure 53 extending to a slightly smaller diameter than the minimum diameter defined about the axially inner ends of the retaining shoulders 21 of the retaining beads. Application of the cover 45 is accomplished similarly as the covers 10 and 35. That is, the cover is canted in toward the wheel so that the retaining bead 53 engages the base portions of the retaining shoulders 21 of two adjacent ones of the retaining bumps 19 and the bead intermediate such bumps fits into one of the hollowed out portions 31 of the cover. Thereupon the cover is pressed in toward the wheel at the opposite side and the retaining bead 53 cams over and snaps behind the retaining bump 19 until the cover is squared up and substantially centered with relation to the wheel.

In Figure 9 is shown a modification wherein the cover comprises a hub cap 55 which has a central crown portion 57 and a side wall 58 extending generally axially inwardly and provided with an inturned reinforcing and cover-retaining bead flange 59 which is of a slightly smaller diameter than the minimum diameter defined by the axially inner ends of the retaining bump shoulders 21. Application of the cover 55 to the wheel is similar to the previously described covers, namely, the cover 55 is canted in toward the wheel so that the bead 59 fits into one of the depressions 31 of the wheel and the bead 59 engages two of the retaining shoulders 21. Thereupon the cover is pressed in toward the wheel at the opposite side so that the remaining bump is engaged by snapping thereover of the retaining bead 59.

In the modification of Figures 5 and 6, instead of the wheel being provided with depressions between the bumps to accommodate the retaining bead or flange portion of the cover, the cover is provided with inset portions of the retaining bead or flange structure thereof so as to enable canting of a portion of the cover toward the wheel for accomplishing the same result as described in connection with the forms of Figures 2, 7, 8 and 9. To this end, a cover 60 is provided having a central crown portion 61 and a marginal portion 62 for covering respectively the wheel body and the tire rim of a wheel, while an intermediate portion or an attached retaining flange portion 63 of the cover has a retaining bead flange 64 engageable with retaining bumps 65 on a nose bulge 67 of a wheel body 68. At suitable intervals such as three equally spaced intervals, the retaining flange portion of the cover 60 is provided with inset or depressed clearance areas 69 with intervening axially inwardly offset portions 70 which are adapted to engage the retaining bumps 65 while the inset areas 69 engage the wheel body intermediate the retaining bumps 65 where the wheel body is unmodified for accommodating canting in of a portion of the cover in applying it to the wheel. In Figure 5 the full line position of the cover shows a portion of the retaining flange or bead 64 engaging the wheel body as an incident to canting the cover into position in applying the cover to the wheel, while the dash outline position of the cover indicates the relationship of the cover to the retaining bumps after the cover has been leveled out and centered on the wheel by engagement of the diametrically opposite retaining bump in retaining relation by the retaining bead flange structure 64. It will be understood, of course, that during pry-off the reverse action takes place.

From the foregoing it will be observed that in all forms of the wheel and cover the annular retaining bead or flange structure may be of fairly stiff resilience since substantial stretching or resilient deflection will occur primarily at one point and equalization stretching or resilient yielding at the remaining points engaging the retaining bumps need be of only quite minor extent following the snapping of the one resiliently deflected portion over the one bump. The portions of the retaining ring structure which engage the initially contacted retaining bumps in effect fulcrum on the contiguous portions of the wheel body and of the axially inner end portions of the retaining shoulder faces of the retaining bumps as the opposite side of the cover is snapped inwardly onto the wheel.

As the term "retaining ring structure" shall be used in the claims, it is intended to mean any one of the forms of retaining ring flange or bead shown in the several modifications of the present application, or any equivalent thereof, engageable retainingly under resilient tension with the retaining bumps and at least stiffly resiliently flexible for stretching or resiliently deflecting over one of the bumps when the cover is applied to the wheel or removed from the wheel as herein described. When fully engaged with the retaining bumps, the retaining ring structure maintains an equalized strong resilient tensioned grip upon the undercut retaining shoulders of the retaining bumps on the wheel.

It will be understood that modifications and variations may be effected without departing from the scope of the novel concepts of the present invention.

I claim as my invention:

1. In a wheel structure including a tire rim and a wheel body of the disk spider type having an annular intermediate nose bulge between a radially inner bolt-on flange and a radially outer marginal portion attached to the tire rim, with a circumferentially spaced series of generally radially outwardly projecting cover retaining bumps on the radially outer side of the nose bulge spaced radially inwardly from the marginal extremity of the wheel body so that a substantial outer marginal portion of the wheel body facing generally axially outwardly intervenes between the bumps and said marginal extremity, a cover for disposition at the outer side of the wheel and provided with generally radially inwardly directed retaining ring structure portion engageable in snap-on, pry-off relation with said bumps, one of said portions having an inset area intermediate a pair of the retaining bumps for enabling cocked initial assembly disposition of the cover with the wheel by closely approaching disposition of said portions at said area and fulcruming engagement of said retaining ring structure portion with said pair of bumps while at the generally opposite side of the cover said retaining ring structure portion is resiliently flexed over another of the bumps in snapping the cover in place on the wheel, and enabling convenient pry-off of the cover by reversal of the assembly coaction as aforesaid.

2. A wheel structure as defined in claim 1, wherein said inset area is in the form of a concave depression in said one portion.

3. A wheel structure as defined in claim 1, wherein said bumps are of substantial width and are chamfered at the sides thereof adjacent to said inset area for clearing said retaining ring portion as an incident to fulcruming thereof on said pair of bumps.

4. In a wheel structure including a tire rim and a wheel body of the disk spider type having an annular intermediate nose bulge between a radially inner bolt-on flange and a radially outer marginal portion attached to the tire rim, with a circumferentially spaced series of generally radially outwardly projecting cover retaining bumps on the radially outer side of the nose bulge spaced radially inwardly from the marginal extremity of the wheel body so that a substantial outer marginal portion of the wheel body facing generally axially outwardly intervenes between the bumps and said marginal extremity, said marginal body portion being recessed between a pair of the bumps to afford axially inward clearance receptive of a portion of a retaining ring structure on a wheel cover upon canted application or removal of the cover with the retaining structure fulcrumed on said pair of bumps.

5. A wheel structure as defined in claim 4, including, on said axially facing portion of the cover margin radially outwardly adjacent to said pair of bumps, generally axially outwardly facing limit shoulder portions engageable by the retaining ring structure of the cover.

6. In a wheel structure including a tire rim and wheel body of the disk spider type having an annular intermediate nose bulge between a radially inner bolt-on flange and a radially outer marginal portion attached to the tire rim, with a circumferentially spaced series of generally radially outwardly projecting cover retaining bumps on the radially outer side of the nose bulge spaced radially inwardly from the marginal extremity of the wheel body so that a substantial outer marginal portion of the wheel body facing generally axially outwardly intervenes between the bumps and said marginal extremity, said axially outwardly facing marginal portion of the wheel body having between a pair of said bumps a recessed area, and a cover for disposition at the outer side of the wheel having a retaining ring structure engageable in resiliently tensioned relation with the retaining bumps, said retaining ring structure being arranged to cant into said recessed area incident to applying or removing the cover by fulcruming said retaining ring structure on said pair of bumps.

7. A wheel structure as defined in claim 6, wherein the retaining ring structure comprises an intermediate inturned fold flange on the cover and the cover has radially outwardly from said fold flange an annular portion for concealing overlying relation to said marginal body portion and the tire rim.

8. A wheel structure as defined in claim 6, wherein the cover has an outer marginal portion for concealingly overlying the wheel body margin and the tire rim and said retaining ring structure comprises a separate ring member attached behind the cover and provided with a terminal edge for engaging the retaining bumps.

9. A wheel structure as defined in claim 8, wherein said retaining ring has a margin thereof engaged in clamped relation by an underturned outer extremity marginal portion of said cover margin.

10. A wheel structure as defined in claim 8, wherein said ring has a flange thereon attached in face-to-face relation to the back of the cover.

11. A wheel structure as defined in claim 6, wherein said retaining ring structure comprises a turned marginal extremity bead on the cover with the marginal portion of the wheel body and tire rim exposed radially outwardly beyond the marginal bead.

References Cited in the file of this patent

UNITED STATES PATENTS

| | | |
|---|---|---|
| 2,239,898 | Lyon | Apr. 29, 1941 |
| 2,544,703 | Lyon | Mar. 13, 1951 |
| 2,592,584 | Lyon | Apr. 15, 1952 |